United States Patent Office 3,496,171
Patented Feb. 17, 1970

3,496,171
PROCESS FOR IMPROVING THE PHYSICAL AND CHEMICAL PROPERTIES OF CEPHALOGLYCIN
Ralph R. Pfeiffer and Kuo S. Yang, Indianapolis, Ind., assignors to Eli Lilly and Company, Indianapolis, Ind., a corporation of Indiana
No Drawing. Filed Feb. 17, 1969, Ser. No. 799,991
Int. Cl. C07d 99/24; A61k 21/00
U.S. Cl. 260—243                                5 Claims

ABSTRACT OF THE DISCLOSURE

Process for purifying and improving the yield of cephaloglycin antibiotic by (1) dissolving cephaloglycin in a solvent mixture of acetonitrile/water/methanol with acid, (2) precipitating cephaloglycin from the mixture with a base, to form cephaloglycin crystals which are substantially anhydrous upon drying; and optionally re-hydrating the purified cephaloglycin for use of the cephaloglycin in dry re-constitutable pharmaceutical formulations, e.g., in pediatric solutions and suspensions.

BACKGROUND OF THE INVENTION

Field of the invention

This invention relates to cephalosporin-type of antibiotic substances. More particularly, this invention provides a process for improving the purity and yield of cephaloglycin which name is generic for 7-(D-2-amino-2-phenylacetamido) - 3 - (acetoxymethyl) - 8 - oxo - 5 - thia - 1 - azabicyclo[4.2.0]oct - 2 - ene - 2 - carboxylic acid, also named 7-(D-$\alpha$-aminophenylacetamido)cephalosporanic acid. Cephaloglycin differs from cephalosporin C in the fact that cephaloglycin has a 7-(D-$\alpha$-aminophenylacetamido) group instead of the 7-(5'-aminoadipoyl) group, and in the fact that cephaloglycin possesses much greater antibiotic activity against gram-positive and gram-negative microorganisms than cephalosporin C. Cephaloglycin is also of significant interest because it is effective when administered by the oral route.

Description of the prior art

A United States patent application of Robert B. Morin, Ser. No. 571,966, filed Aug. 12, 1966, and the applications parent thereto, disclose various new cephalosporin antiboitics among which is 7-(D-$\alpha$-amino-$\alpha$-phenylacetamido)cephalosporanic acid, and its inner salt as a new compound. Such compound is hereinafter referred to by the generic name, cephaloglycin.

In Pfeiffer et al. application Ser. No. 588,750, filed Oct. 24, 1966, there is disclosed and claimed a process for preparing a substantially anhydrous crystalline form of cephaloglycin which process comprises dissolving crude hydrated cephaloglycin in N-methylformamide or formamide or mixtures thereof, and commingling the resulting solution with an anti-solvent such as a $C_1$ to $C_4$ alkanol, acetonitrile, or an alkyl alkanoate, and drying the resulting crystalline cephaloglycin to less than 1 percent by weight of water. That process provides new, substantially anhydrous crystalline forms of cephaloglycin which is also claimed therein. The substantially anhydrous cephaloglycin produced thereby can be used in antibiotic formulations as such, or preferably is re-hydrated to cephaloglycin dihydrate before being compounded into pharmaceutical formulations. Although this formamide or N-methylformamide solvent/alkanol, acetonitrile, or alkyl alkanoate anti-solvent system does produce a substantially anhydrous cephaloglycin crystal form, it has also presented some practical problems in scaling up production of cephaloglycin to commercial size runs. The formamide and N-methylformamide produce viscous solutions or slurries which are difficult to handle, and such amides are difficult to remove from the crystalline cephaloglycin product. Furthermore, the substantially anhydrous cephaloglycin crystalline product obtained by that described process cannot be re-dissolved directly in N-methylformamide or formamide to repeat the purification procedure. Such anhydrous cephaloglycin must first be re-hydrated before re-solution in formamide or N-methylformamide can be effected. In addition, formamide and N-methylformamide solutions of cephaloglycin tend to hold a portion of their cephaloglycin content in solution, despite the use of cephaloglycin precipitating agents or anti-solvents such as methanol, so that the ultimate yield of purified, crystalline cephaloglycin is to that extent lower than desired. It is also desired to separate more of the phenylglycine used in the manufacture of cephaloglycin from the crystalline product. Also, those in the cephalosporin manufacturing art are in need of a cephaloglycin purification procedure which is versatile enough to permit ready re-solution and re-precipitation of the crude or semi-pure cephaloglycin product by manufacturing personnel without time consuming re-hydration steps.

It is an object of this invention to provide a process for improving the purity and yield of cephaloglycin.

It is a further object of this invention to provide a cephaloglycin purification process involving the use of a solvent mixture and precipitation system which can be used a number of times without the need for re-hydration of the cephaloglycin product before effecting re-solution of the cephaloglycin.

Other objects, aspects and advantages of this invention will become apparent from reading the additional description and claims which follow.

BRIEF DESCRIPTION OF THE INVENTION

Briefly, we have found a better solvent and precipitation system and an improved process incorporating that system, for converting cephaloglycin from a crude or semi-pure state to a denser, more pure cephaloglycin, substantially free of phenylglycine reactant, in better yield than was previously obtainable. One variation of our process comprises (1) dissolving cephaloglycin with the aid of an acid in a solvent mixture comprising (a) from about 1 to about 3 parts by volume of acetonitrile, (b) about 1 part to about 3 parts by volume of water, and (c) from about 1 part to about 3 parts by volume of methanol, said solvent mixture containing a total of from 3 to about 9 parts by volume, (2) treating the cephaloglycin-containing solution from step 1 with sufficient base to adjust the pH of the mixture to the pH range in which cephaloglycin precipitates, and (3) separating the precipitated cephaloglycin from the base-treated solution mixture.

An alternative procedure which can be used is to dissolve cephaloglycin in a mixture of the acetonitrile and water components with the aid of acid, with or without a portion of the methanol component being present initially in the mixture, and then to add a portion or all of the methanol component with the base in step 2. This alternative helps to slow the crystallization procedure to obtain denser, more easily filtered cephaloglycin crystals.

Optionally and preferably the separated cephaloglycin crystals obtained from step 3 above are treated with water or water vapor, to form the cephaloglycin dihydrate therefrom, either directly, or after washing the separated cephaloglycin with an alkanol such as methanol, and drying. We find that the improved physical properties of the cephaloglycin crystals obtained by the above procedure (steps 1–3) can be preserved by converting this cephaloglycin to the di-hydrate by exposure to high relative humidity.

DETAILED DESCRIPTION OF THE PROCESS

We have found that if cephaloglycin is dissolved in a solvent system which eventually contains acetonitrile, water, and methanol, as described above, when base is added to precipitate the cephaloglycin, the crystalline cephaloglycin obtained is denser, more pure, and is more completely precipitated from the solution, thus improving the yields of recovered cephaloglycin from given quantities of dissolved cephaloglycin. Thus, the so-called steps 1 and 2 of the process of this invention can be conducted separately, as first described above, or the two steps can be merged by the addition of the methanol with the base.

The useful range of the acetonitrile:methanol:water solvent mixture used in the process of this invention for cephaloglycin purification and yield enhancement is approximately within the proportions of 1:3:3 to 3:1:3, to 3:3:1, by volume, of acetonitrile:methanol:water, respectively. Outside these general limits, gels, very fine crystals, or other undesired forms of cephaloglycin are obtained.

The acid used to effect cephaloglycin solution in the solvent mixture can be any strong water miscible acid having a pKa of less than 4. The preferred acids are the economical mineral acids such as hydrochloric, sulfuric, nitric, and orthophosphoric acids. Hydrocarbon-sulfonic acids, especially the $C_1$ to $C_6$-alkanesulfonic acids such as methanesulfonic, propanesulfonic, and hexanesulfonic acids as well as the $C_6$ to $C_{12}$-aromatic hydrocarbonsulfonic acids such as benzenesulfonic, p-toluenesulfonic, alpha-naphthalenesulfonic acid, and biphenylsulphonic acids, and the halogenated $C_6$ to $C_{12}$-aromatic hydrocarbon sulfonic acid, p-bromobenzenesulfonic acids, and the like, can also be used. Weaker $C_1$ to $C_6$-alkanoic carboxylic acids such as acetic, propionic, and the like can also be used in that they make up for their weaker acidity by adding their solvent properties to the solvent system.

Other alkanenitriles such as propionitrile and butyronitrile can be substituted for part or all of the acetonitrile in the solvent system but acetonitrile is preferred. Ethanol and the $C_3$ to $C_6$-alkanols can be substituted for part of the methanol, but the use of larger amounts of those alkanols makes the crystallization more difficult to control. Hence, methanol is the preferred alcohol.

The base added in step 2 of the process can be any water-miscible base having a fairly strong pKa, say, above 4. It is preferably added in solution to avoid excessive rise in local pH and is added in quantity sufficient to adjust the pH of the mixture to the pH range in which cephaloglycin precipitates. Generally, maximum precipitation occurs at pH 3.5 to 5.0. The preferred bases are ammonium hydroxide, sodium or potassium hydroxide, $C_1$ to $C_3$-trialkylamines such as triethylamine, and the like. The base is preferably added in concentrated form with agitation until the rate of cephaloglycin precipitation is satisfactory. A convenient measure is to add the base until it is equivalent to the amount of acid that was added in step 1, but exact stoichiometric equivalency is not required with all solvent systems.

When all or most of the cephaloglycin has precipitated from the solvent mixture, it is separated from the liquid by conventional methods, e.g., filtration, centrifugation, washed, if desired, with methanol or acetone, and dried at from about 30° to about 60° C., preferably under vacuum, for from about 1 to 6 hours, or until the weight becomes constant. The cephaloglycin crystals obtained by this process may be dried to contain less than 1 percent, by weight, of water, preferably less than 0.5 percent water. The cephaloglycin anhydrate resulting from these procedures have the same cephaloglycin anhydrate X-ray pattern as that obtained by the formamide-methanol procedure described in the Pfeiffer et al. application, Ser. No. 588,750, filed Oct. 24, 1966. However, the cephaloglycin crystals are substantially free of phenylglycine carried through from the manufacturing process and obtained in improved yield, relative to the yields by prior processes.

The anhydrous cephaloglycin product of this process can be used as such for forming aqueous solutions and suspensions for antibiotic therapy with this compound. It is preferably converted to the cephaloglycin dihydrate crystalline form (approximately 8 to 10 percent water, by weight) for use in making dry solid reconstitutable formulations for antibiotic therapy. The improved bulk flow and density properties of the anhydrous cephaloglycin crystals obtained by the process of this invention can be preserved by exposing the substantially anhydrous cephaloglycin to high relative humidity in a suitable tumbling or mixing apparatus until the cephaloglycin dihydrate is formed. Other hydration methods can be used, however. As an example, the substantially anhydrous cephaloglycin, prepared as described above, can be re-hydrated to a water content of about 8 to 10 percent by weight by grinding the anhydrous cephaloglycin crystals for about 0.5 hour in water, filtering the mixture, washing the solid with acetone, and then drying in a vacuum oven to constant weight.

An example of a pharmaceutical formultion into which the re-hydrated cephaloglycin can be placed for antibiotic administration is the following.

Formula for suspension cephaloglycin to provide 250 mg./5 cubic centimeters

|  | Weight, g. |
| --- | --- |
| Crystalline cephaloglycin hydrate | 5.5 |
| Sucrose, Baker's grade | 50.0 |
| Saccharin, soluble | 0.2 |
| Sodium cyclamate | 1.0 |
| Sodium chloride, U.S.P. powder | 0.5 |
| Citric acid powder | 0.1 |
| Sodium citrate powder | 0.2 |
| F, D, and C Yellow No. 6, aluminum lake certified | 0.05 |
| Imitation orange juice flavor, 59.107/AP Firmenich, Inc. | 1.0 |
| Peppermint flavor E 1395 | 0.1 |
|  | 58.65 |

Samples of the above formulations can be stored as a dry powder mixture in sealed containers at 25, 27, and 50° C. for time periods up to 1 month. When samples are taken for standard microbiological assay of cephaloglycin content of the dry mixture, or in preparation of the aqueous suspension for administration, a proper amount of purified water was added to make the suspension containing about 50 mg. of cephaloglycin per cubic centimeter of suspension.

The invention is further illustrated by the following detailed examples.

EXAMPLE 1

A 10 g. portion of cephaloglycin was suspended in 400 ml. of a solvent mixture consisting of acetonitrile: methanol:water in a 1:1:1 proportion by volume. To this suspension 3 ml. of concentrated hydrochloric acid (12 N) was added dropwise until the cephaloglycin solution being effected became clear, except for a few lumps which were removed by filtration. To this resulting cephaloglycin solution, concentrated ammonium hydroxide (14 N) was added dropwise until the amount thereof was equivalent to the acid added. The resulting mixture was allowed to stand while cephaloglycin crystals formed. The crystals were separated from the neutralized solvent mixture and dried at 30° C. under vacuum to a water content of less than 0.5 percent by weight.

EXAMPLE 2

In this example, 10 g. of cephaloglycin was suspended in 100 ml. of an acetonitrile:water mixture in 1:1 by volume mixture and then about 2.5 ml. of concentrated hydrochloric acid was added until cephaloglycin solution was effected. Then the methanol (50 ml.) was added with the ammonium used to neutralize the equivalent amount of acid and to effect cephaloglycin crystallization. Upon separation of the cephaloglycin crystals from the neutralized solvent system and dried under vacuum at 30° C. for three hours, the crystals were of the anhydrous cephaloglycin crystalline form and were better formed and larger size than obtained from the formamide-methanol method.

EXAMPLE 3

This example sets forth a typical procedure for preparing cephaloglycin by acylating 7-aminocephalosporanic acid (7–ACA) with an N-blocked-amino mixed anhydride form of phenylglycine, followed by an example of the re-crystallization and purification procedure of this invention.

Blocking the amino group

D-alpha-phenylglycine, levorotatory, is slurried in benzene in a stainless steel still. A 50 percent solution of sodium hydroxide is added, and the mixture is heated at 50°–60° C. for one hour. Methyl acetoacetate is added and the still contents refluxed until all water has been removed by azeotropic distillation. The reaction mixture is diluted with an equal volume of acetone, then transferred to a brine pot and chilled. The sodium 3-(D-alpha-carboxybenzylamino) crotonate salt crystals

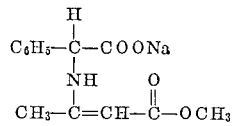

are filtered, washed with acetone, air dried at 65° C., and ground to a fine powder.

7-ACA tosylate salt preparation 7-aminocephalosporanic acid (7-ACA) is slurried in acetone in a glass-lined brine pot and a solution of p-toluene-sulfonic acid (tosylate) monohydrate in acetone is added at 5° C. to −5° C. The mixture is stirred for one hour. Then filtered to remove insoluble impurities. The 7-ACA tosylate dihydrate is precipitated from the filtrate by the addition of water, separated by filtration, washed with acetone, and air dried at room temperature.

Mixed anhydride formation

The sodium 3-(D-alpha-carboxybenzylamino)crotonate and a catalytic amount of N,N-dimethylbenzylamine are slurried in acetonitrile in a glass-lined or stainless steel brine pot and the slurry is chilled to −10° C. to 0° C. Methyl chloroformate is added rapidly and the mixture is stirred a few minutes to form the methyl mixed anhydride of the N-blocked phenylglycine. Meanwhile, the 7-ACA·tosylate is converted to the soluble triethylamine salt in 50 percent water-50 percent-acetonitrile mixture of 0° C. to 5° C.

Acylation and removal of N-protecting group

The 7-ACA·triethylamine salt solution is added rapidly to the mixed anhydride while stirring. Stirring is continued for a few minutes, and then any insoluble material is dissolved with triethylamine. After one-half hour stirring, the solution is adjusted to pH 1.5 with concentrated hydrochloric acid at −5° to +5° C. to effect cleavage of the amino-protecting group from the cephaloglycin molecule. Methanol is added with stirring for an additional 1.5 hours and the pH is raised to 4.5 to precipitate the crude cephaloglycin crystals. The methanol enhances the crystal size of the cephaloglycin for filtration or centrifugation purposes.

Re-crystallization and purification

The crude cephaloglycin is then redissolved in a 1:1:1 (volume) mixture of water, acetonitrile, and methanol, using hydrochloric acid to complete solution, and then reprecipitated from the solution by adding triethylamine to precipitate the cephaloglycin. After filtering the cephaloglycin and washing with methanol, it is dried in vacuo at 30° C. to a constant weight. It is a substantially anhydrous cephaloglycin containing less than 0.5 percent water, by weight. Increased phenylglycine removal is effected by use of a 2:1:1 (volume) mixture of water, acetonitrile, and methanol, respectively, but the average yield of purified cephaloglycin crystals upon precipitation therefrom tend to be somewhat lower than with the above proportioned solvent mixture.

Rehydration

The substantially anhydrous cephaloglycin is mixed with deionized water in a vacuum drier equipped with an internal agitator of a dough mixer. The excess water is removed by vacuum drying and the cephaloglycin dihydrate is milled as required.

We claim:
1. A process which comprises (a) dissolving cephaloglycin with the aid of acid in a solvent mixture of acetonitrile:methanol:water, the proportions of the components of such mixture being from about 3:1:3 to about 3:3:1 to about 1:3:3 by volume, (b) treating the cephaloglycin mixture from step (a) with sufficient base to adjust the pH of the mixture to the point at which cephaloglycin precipitates, and (c) separating the precipitated cephaloglycin from the base treated solvent mixture.

2. A process as defined in claim 1 which further includes the steps of mixing the precipitated cephaloglycin from step 3 with water to form a cephaloglycin dihydrate crystalline material 3. A process as defined in claim 1 wherein in step (a) the solvent mixture comprises water, methanol, and acetonitrile in substantially equal parts by volume and hydrochloric acid is used to effect solution of the cephaloglycin in the solvent mixture, and in step (b) a $C_1$ to $C_3$-trialkylamine is added in an amount sufficient to precipitate cephaloglycin from the solution.

4. A process as defined in claim 1 wherein in step (a) the solvent mixture comprises water, methanol, and acetonitrile in the approximate proportions of about 1 to about 2 parts of water, 1 part of methanol, and 1 part of acetonitrile, and hydrochloric acid is added in an amount sufficient to effect solution of cephaloglycin, in the solvent mixture, and in step (b) a $C_1$ to $C_3$-trialkylamine is added in an amount sufficient to precipitate the cephaloglycin from the solvent mixture.

5. A process as defined in claim 1 wherein in step (a) the cephaloglycin is dissolved with the aid of acid in a mixture of the acetonitrile and water components, and the methanol component is added with the base in step (b).

No references cited.

NICHOLAS S. RIZZO, Primary Examiner